(12) United States Patent
Petrus

(10) Patent No.: US 7,389,111 B2
(45) Date of Patent: Jun. 17, 2008

(54) ADAPTIVE DETERMINATION OF HYSTERESIS FOR FACILITATING BASE STATION SELECTION, INCLUDING HANDOVER, IN A WIRELESS COMMUNICATION SYSTEM

(75) Inventor: Paul Petrus, Santa Clara, CA (US)

(73) Assignee: ArrayComm, LLC, San Jose, CA (US)

( * ) Notice: Subject to any disclaimer, the term of this patent is extended or adjusted under 35 U.S.C. 154(b) by 233 days.

(21) Appl. No.: 10/606,515

(22) Filed: Jun. 25, 2003

(65) Prior Publication Data

US 2004/0267928 A1 Dec. 30, 2004

(51) Int. Cl.
*H04Q 7/20* (2006.01)
(52) U.S. Cl. .................. 455/436; 455/436; 455/437; 455/438; 455/439; 455/442; 455/443; 455/444; 370/331; 370/332; 370/333
(58) Field of Classification Search ............... 455/436, 455/437, 438, 440, 441, 525, 456.1, 456.2, 455/456.3, 456.4, 456.5, 456.6, 453, 439, 455/442, 443, 444, 445, 522; 370/331, 332, 370/333

See application file for complete search history.

(56) References Cited

U.S. PATENT DOCUMENTS

| | | | | |
|---|---|---|---|---|
| 6,018,663 | A * | 1/2000 | Karlsson et al. ............. | 455/450 |
| 6,175,745 | B1 * | 1/2001 | Bringby et al. .............. | 455/522 |
| 6,285,883 | B1 * | 9/2001 | Bringby et al. .............. | 455/437 |
| 6,363,252 | B1 * | 3/2002 | Hamalainen et al. ........ | 455/436 |
| 6,466,164 | B1 * | 10/2002 | Akopian et al. ....... | 342/357.15 |
| 6,498,934 | B1 * | 12/2002 | Muller ........................ | 455/450 |
| 6,745,033 | B1 * | 6/2004 | Shah et al. .................. | 455/436 |
| 6,954,643 | B2 * | 10/2005 | Petrus ......................... | 455/437 |
| 2001/0002822 | A1 * | 6/2001 | Watters et al. ........... | 342/357.1 |
| 2002/0045448 | A1 | 4/2002 | Park et al. | |
| 2002/0082012 | A1 * | 6/2002 | Wang et al. ................. | 455/435 |
| 2003/0073455 | A1 * | 4/2003 | Hashem et al. ............. | 455/525 |

(Continued)

FOREIGN PATENT DOCUMENTS

WO        WO 0230135 A2 *    4/2002

OTHER PUBLICATIONS

Michael Eiselt, Limits on WDM Systems Due to Four-Wave Mixing: A statistical Approach, Nov. 1999, Journal of Lightwave Technology, vol. 17, No. 11, pp. 2261-2267.*

(Continued)

*Primary Examiner*—Rafael Perez-Gutierrez
*Assistant Examiner*—Olumide Ajibade-Akonai
(74) *Attorney, Agent, or Firm*—Blakely Sokoloff Taylor & Zafman LLP

(57) ABSTRACT

The present invention provides method and apparatus for facilitating base station selection/handover by a user terminal in a distributed (e.g., cellular-type) wireless communication system. In accordance with one aspect, hysteresis is adaptively determined as a function of the variance of receive signal strength fluctuations. In turn, an adaptive hysteresis factor can be obtained and used for a subsequent handover decision, for example, based on a cost function that takes into account the hysteresis. In accordance with another aspect, base station selection depends on a number of criteria, such as received signal strength, base station load, and estimated distance between a receiving user terminal and one or more base stations.

20 Claims, 9 Drawing Sheets

U.S. PATENT DOCUMENTS

2004/0053615 A1* 3/2004 Kim et al. .................. 455/436

OTHER PUBLICATIONS

B.Senadji and B. Boashash, Estimation of the Hystersis Value for Hanover Decision Algorithms Using Bayes Criterion, Singapore, Internetional Conference on Information, Communications and Signal Processing, 1997. ICICs, pp. 1771-1775, vol. 3.*

Ye Min-hua, Liu Yu, Zhang Hui-min, The Mobile IP handoff Between Hybrid Networks, Sep. 15-18, 2002, IEE Personal Indoor Mobile Radio Communications, 2002, vol. 1, pp. 265-269.*

Jack M. Holtzman and Louay M.A Jalloul, Rayleigh Fading Effect Reduction with Wideband DS/CDMA Signals, Global Telecommunications Conference, 1991, Globecom '91, IEEE, vol. 1, pp. 553-557.*

Itoh Ken-Ichi, Soichi Watanabe, Jen-Shew Shih, and Takuro Sato, Performance of Handoff Algorithm Based on Distance and RSSI Measurements, Nov. 2002, IEEE Transactions on Vehicular Technology, vol. 51, No. 6, pp. 1460-1468.*

Rajiv Vijayan, "A Model for Analyzing Handoff Algorithms", *IEEE Transactions on Vehicular Technology*, vol. 42, No. 3, Aug. 1993, p. 351-356.

Eiselt, Michael, "Limits on WDM Systems Due to Four-Wave Mixing: A statistical Approach", Nov. 1999, *Journal of Lightwave Technology*, vol. 17, No. 11, (Nov. 1999),pp. 2261-2267.

Holtzman, Jack M., et al., "Rayleigh Fading Effect Reduction with Wideband DS/CDMA Signals", *Global Telecommunications conference*, 1991, *Globecom '91, IEEE*, vol. 1., (1991),pp. 553-557.

Min-Hua, Ye, et al., "The Mobile IP Handoff Between Hybrid Networks", Sep. 15-18, 2002, *IEE Personal Indoor and Mobile Radio Communications*, 2002, vol. 1., (Sep. 2002),pp. 265-269.

Senadji, B., et al., "Estimation of the Hystersis Value for Handover Decision Algorithms Using Bayes Criterion", *Singapore, International Conference on Information, Communications and Signal Processing*, 1997. *ICICs*, vol. 3., (Sep. 1997),pp. 1771-1775.

* cited by examiner

ADAPTIVE DETERMINATION OF HYSTERESIS FOR FACILITATING BASE STATION SELECTION, INCLUDING HANDOVER, IN A WIRELESS COMMUNICATION SYSTEM

FIELD OF THE INVENTION

The present invention relates to the field of wireless communications systems, and in particular, to a method and system for adaptively determining hysteresis used for base station selection, including handover.

BACKGROUND OF THE INVENTION

Distributed or "cellular" radio communication systems are typically comprised of a number of cells, with each cell corresponding roughly to a geographical area. Each cell has an associated base station (BS) which is a local central site providing access to the communication system to a number of radio transmitter/receiver units (user terminals (UTs)) within the cell.

In such distributed wireless communication systems, a user terminal generally has the capability to move in and out of various cells. While a base station typically handles traffic exchange with a number of user terminals within its cell, a user terminal typically exchanges traffic with a single base station at a time. However, when communication quality degrades with respect to a particular base station(s) and improves with respect to one or more other base stations (e.g., due to changes in the RF environment, movement of the user terminal away/toward cells, etc.), the user terminal should be able to handover "active communication" to the base station providing better communication.

FIG. 1 depicts a typical distributed voice and/or data network topology, in accordance with the prior art. As shown, a number of base stations 102, 104, and 106 are distributed geographically, such that each provides a cell coverage area (or simply cell) 112, 114, and 116, respectively. In turn, the cells 112, 114, and 116 each has an associated cell boundary 118, 120, and 122, respectively, simplistically depicted circularly in FIG. 1.

As a user terminal 108 shown in cell 114 (and therefore assumed to be in active communication, i.e., exchanging voice and/or data traffic, with the associated base station 104 which may be coupled to a larger voice and/or data network, such as PSTN or the internet) moves in a direction 110 away from the base station 104 and toward the base station 106 and its associated cell boundary 122, handover will typically take place—i.e., the user terminal's active communication session will transfer to the new base station 106. As such, if the user is, for example, exchanging data with a device coupled to the internet (which in turn is coupled to the base stations shown in the network 100 of FIG. 1), such exchange will not be interrupted due to the user terminal's movement away from the cell coverage of one station; the exchange or session will be handed over to another base station.

Handover schemes are typically based on optimizing a cost function (C) that depends on one or more parameters, such as the received signal strengths (RSSI) from one or more base stations within the communication range of the user terminal, or visa versa, at a given time. As such, the scheme can be implemented by the user terminal, the base station, or a combination thereof. Most common schemes involve user terminal-centric handover, i.e., measurements (e.g., RSSI) made by the UT are solely used in the handover cost function. In such schemes, the user terminal periodically samples transmissions (e.g., the broadcast message(s)) from a set of base stations, including any with which it is in active communication, and optimizes the cost function to select the best base station.

Because of the fluctuations (e.g., due to shadowing and other real-world RF effects) in the power of each base station as experienced by a user terminal, the handover cost function C usually should include a margin, sometimes known as a hysteresis margin. In other words, $$C=(S_A-S_i)+h, \tag{1}$$

where h is the hysteresis (sometimes also referred to as the hysteresis margin or factor), $S_A$ is the RSSI of the current (or also sometimes referred to as the active) base station, and $S_i$ is the RSSI of an ith candidate base station. When C<0, then handover should be initiated.

The hysteresis margin h is included in the cost function to prevent the user terminal from frequent "ping ponging" between two or more base stations due to the power fluctuations of their transmissions. This particular need for h is further illustrated and described in connection with FIG. 2.

FIG. 2 is a graphical representation of the theoretical and practical signal strengths of two base stations experienced by a user terminal as the user terminal moves away from one of the base stations with which it is in active communication and toward the other base station. The signal strength of each base station's transmissions as received at the user terminal 108 is represented by the vertical axis as a function of distance as the user terminal 108 moves with a velocity 110 away from base station 104 and toward base station 106.

Ignoring the practical power fluctuations described above, the pathloss associated with the base stations 104 and 106, given the user terminal 108's described motion, could be represented by the lines 204 and 206, respectively, in which case there would be no need for h. In this ideal case, once the two lines cross and the RSSI associated with base station 106 exceeds that associated with the base station 104, handover to base station 106 can occur smoothly without the ping pong effect alluded to above.

However, because of a somewhat chaotic RF environment, where shadowing, scattering, etc., cause power fluctuations and a non-linear pathloss to occur, the actual pathloss associated with base stations 104 and 106 and experienced by the receiving user terminal 108 might appear more like the irregular graphical lines 202 and 208, respectively. And as evident from the regions 210 and 212, for example, there may be instances where the RSSI of one base station exceeds the other, but then shortly later, the situation may reverse, contributing to a back-and-forth or "ping pong" handover effect.

To prevent a ping pong handover effect from occurring, some prior techniques select a relatively large h to use in the handover cost function C. However, if the hysteresis factor h is fixed at too large a value, then communication quality may degrade too much before handover takes place. On the other hand, if the hysteresis is too small, then there may still exist a potential for the above-described ping pong effect to occur. To illustrate, the behavior of the pathloss lines 202 and 208, for example, near the intersection of their ideal counterparts 204 and 206, respectively, show that (1) if h is fixed value that is selected too small, it will likely contribute to an undesired ping pong effect and (2) if h is fixed value that is selected to be too large, handover may be delayed until communication quality degrades beyond a desirable level.

Because the velocity of the user terminal influences signal strength (e.g., RSSI) calculations when windowing is used, some handover techniques use a variable measuring window in which to take signal strength measurements, and then change the window length relative to the calculated velocity of the user terminal. Unfortunately, this technique suffers from drawbacks. First, estimating the velocity of the user terminal is a relatively difficult task. Second, using a variable window length renders implementation, for example in a digital signal processor (DSP), impractical since buffers need to change.

In addition, though the cost function (C) primarily is a function of signal strength, there may be instances where selecting a base station whose C is optimized relative to other base stations may not provide optimum performance. Unfortunately, most prior techniques have not addressed using other selection criteria for selecting a base station.

Thus, what is needed is a method and apparatus for facilitating base station selection, including handover, to overcome the above-mentioned limitations of prior systems and methods.

SUMMARY OF THE INVENTION

The present invention provides a method and apparatus for facilitating initial base station selection and/or handover (collectively referred to herein as base station selection). In accordance with one aspect, hysteresis is adaptively determined as a function of the variance of receive signal strength. In turn, an adaptive hysteresis factor can be obtained and used for a subsequent handover decision, for example, based on a cost function that takes into account the hysteresis. In accordance with another aspect, base station selection takes into account a set of one or more selection criteria (e.g., distance and base station load) in addition to signal strength and hysteresis information to select a base station.

DETAILED DESCRIPTION

The present invention provides a method and apparatus for facilitating initial base station selection and/or handover (collectively referred to herein as base station selection). In accordance with one aspect, hysteresis is adaptively determined as a function of the variance of receive signal strength. In turn, an adaptive hysteresis factor can be obtained and used for a subsequent handover decision, for example, based on a cost function that takes into account the hysteresis. In accordance with another aspect, base station selection takes into account a set of one or more selection criteria (e.g., distance and base station load) in addition to signal strength and hysteresis information to select a base station.

In the following description, numerous specific details are set forth. However, it is understood that embodiments of the invention may be practiced without these specific details. In other instances, well-known structures and techniques have not been shown in detail. It should be noted that the various elements of the invention may be implemented in hardware (e.g., circuitry), software (e.g., machine-executable instructions), or a combination thereof. Furthermore, multiple general-purpose and/or digital signal processing (DSP) processors, ASICs or other types of data processing logic may be employed by a base station or user terminal of the present invention to carry out one or more methods of the present invention.

Reference throughout the specification to "one embodiment" or "an embodiment" means that a particular feature, structure, or characteristic described in connection with the embodiment is included in at least one embodiment of the invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Figure 3:
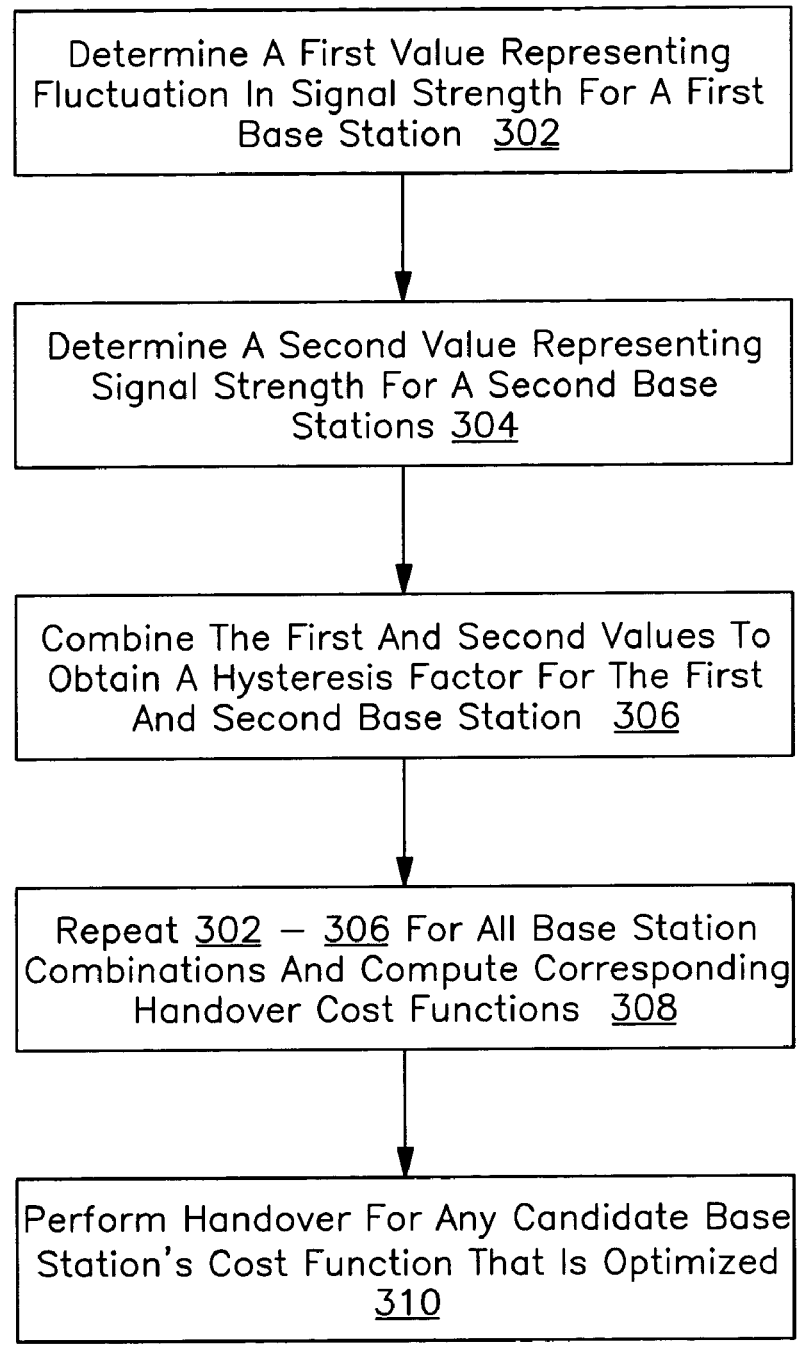
FIG. 3 is a flow diagram of a method for adaptively computing a hysteresis factor for facilitating base station selection, according to one embodiment of the invention.

FIG. 3 is a flow diagram of a method for adaptively computing a hysteresis factor for facilitating base station selection, according to one embodiment of the invention. In one embodiment of the invention, the method shown in FIG. 3 is performed exclusively by the user terminal. It will be appreciated to those skilled in the art, however, that the invention can be modified to allow the method to be performed in conjunction with one or more base station(s) as well.

At block 302, a first value representing the fluctuation in signal strength (e.g., RSSI) for a first base station is computed.

At block 304, a second value representing the fluctuation in signal strength for a second base station is computed.

At block 306, the first and second values are combined to obtain a hysteresis factor associated with the first and second base stations.

At block 308, the process from blocks 302 through block 306 is repeated for all "candidate" base stations (i.e., those base stations whose transmissions the user terminal can "hear" above a certain threshold) and a handover cost function C for each candidate base station is computed.

At block 310, handover is performed for any candidate base station whose cost function is optimized.

In one embodiment of the invention, as become apparent from the description that follows, the handover is not based solely on the cost function (which in turn is based on hysteresis and relative receive signal strengths), but also is based on other base station selection criteria, e.g., estimated distance to, load of, and relative difference of cost functions.

Computation of Signal Strength Fluctuation

In the embodiment described above with reference to FIG. 3, the first and second values computed at blocks 302 and 304, respectively, represent the signal strength fluctuation for first and second base stations, respectively. The first base station, for example, may be a "current" or "active" base station; that is, one with which the user terminal is actively registered and in communication, and the second base station may be a candidate base station. On the other hand, both first and second base stations may represent candidate base stations, e.g., in the case of initial base station selection; that is, when the user terminal is not actively in communication with a particular base station but rather is searching for an active base station, e.g., upon power-up of the user terminal.

Figure 4:
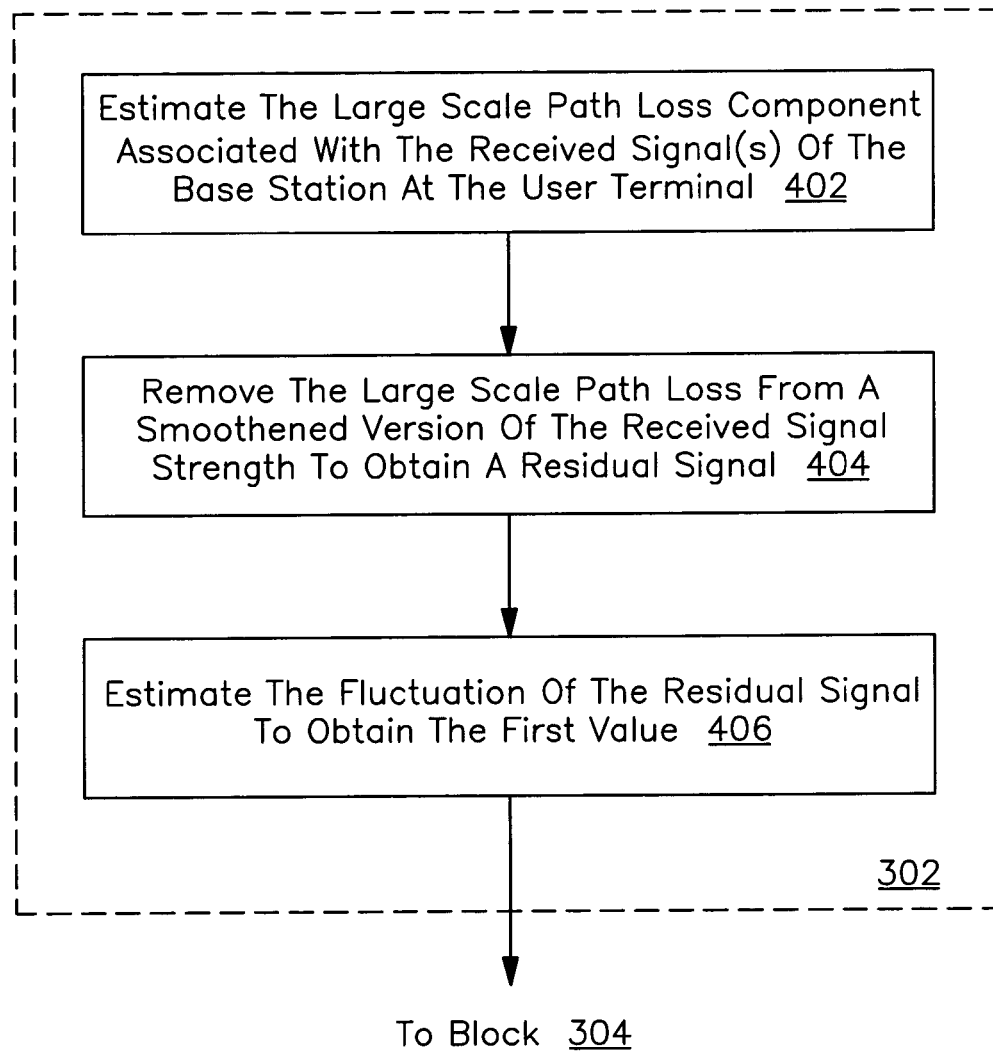
FIG. 4 is a flow diagram of a method for computing signal strength fluctuation for a received signal (e.g., as received by a user terminal from a transmitting base station), in accordance with one embodiment of the invention.

FIG. 4 is a flow diagram of a method for computing signal strength fluctuation for a received signal, in accordance with one embodiment of the invention.

Figure 1:
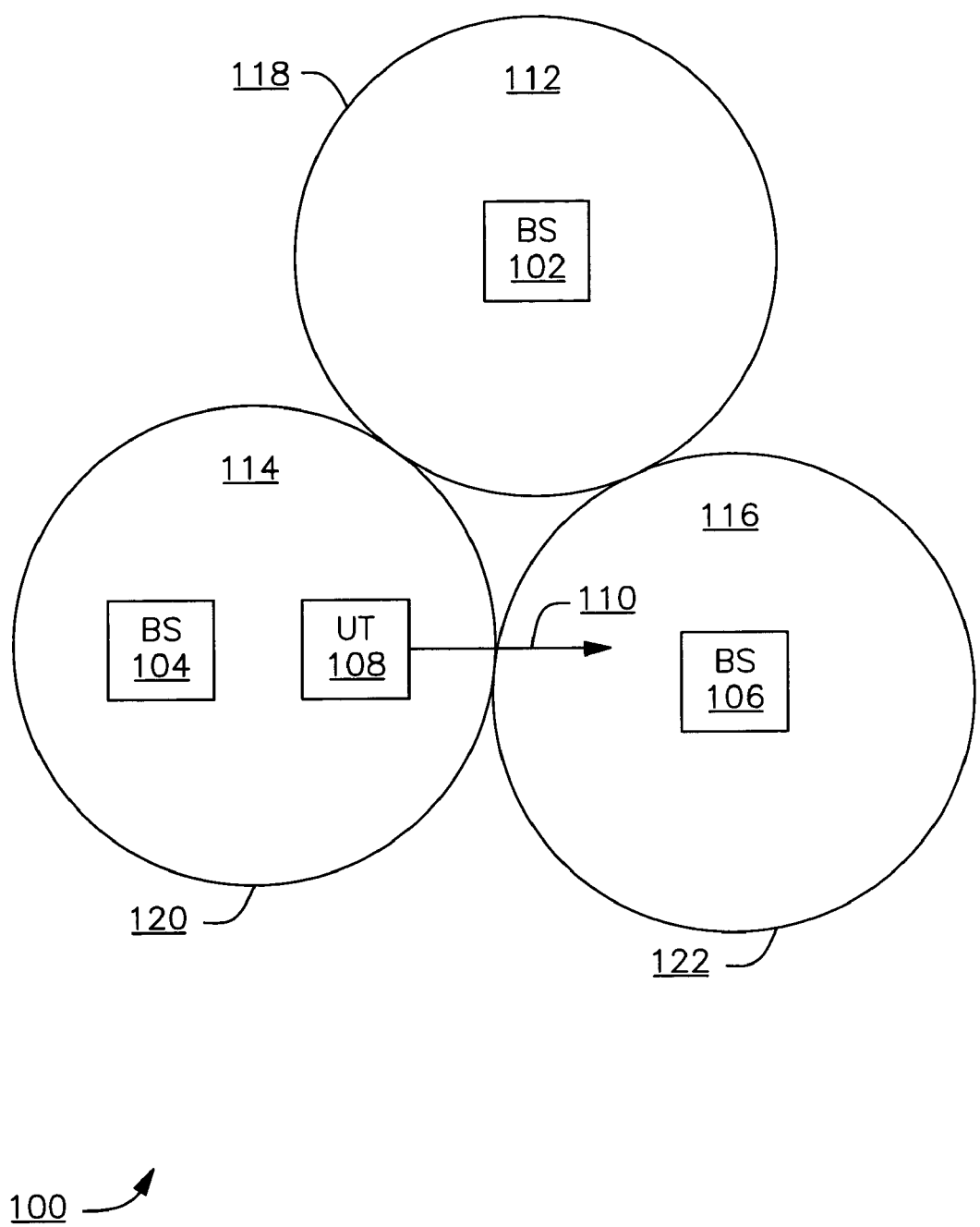
FIG. 1 depicts a typical distributed voice and/or data network topology, in accordance with the prior art.
Figure 2:
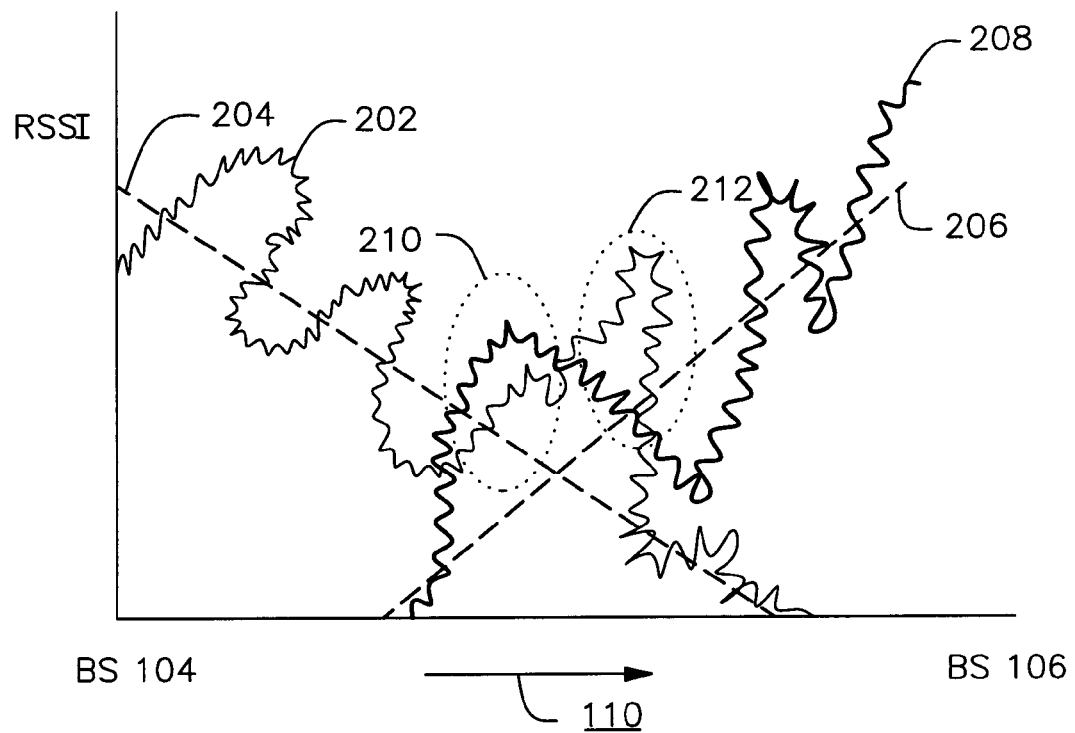
FIG. 2 is a graphical representation of the theoretical and practical signal strengths of two base stations experienced by a user terminal as the user terminal moves away from one of the base stations with which it is active communication and toward the other base station.

At block 402, the large scale pathloss component of the received signal is estimated. Referring back to FIG. 2, the large scale pathloss component for the base station 104's signal as received by the user terminal 108 is depicted by the line 204, which essentially changes as the user terminal moves toward or away from a given base station. In one embodiment, the large scale pathloss is estimated by averaging the received signal over a relatively large interval (i.e., one that includes a relatively large number of samples). However, because averaging introduces a delay in response (e.g., for performing handover) that is proportional to the averaging window length, those skilled in the art will appreciate the trade-off involved in selecting a particular averaging window for computing this large scale pathloss. In one embodiment, the invention samples the broadcast transmission of each candidate base station every 0.5 seconds using a fixed-size sliding rectangular window spanning 25 seconds (equal to 50 samples).

At block 404 the large scale pathloss component computed at block 402 is removed from a representation (which in one embodiment involves smoothing) of the small scale received signal strength from that base station to obtain an intermediate residual signal. In one embodiment of the invention, sharp changes are removed from the power envelope using a fixed-size short term averaging window that spans 5 seconds (or 10 samples), given a base station broadcast sampling duration of 0.5 seconds. In an alternative embodiment, no short term averaging is performed.

At block 406, the fluctuation of the residual signal is estimated by computing the standard deviation $\Gamma$ of the residual signal r in a recursive manner as follows:

For k=1, 2, . . . N $$r(k)=s[k-(L1-L2)/2]-l(k), \quad (2)$$

and $$\Gamma_{(k,i)}=\sqrt{(1-\alpha)\Gamma_{k-1}^2+\alpha r_k^2} \quad (3)$$

where r(k) represents the residual signal; s and l are the short and long term averaged signals, respectively (though in another embodiment, there is no short term averaging). L1 and L2 are the lengths of the long and short averaging windows, respectively; $\alpha$ is the memory factor; and $\Gamma_{(k,i)}$ is the (estimated) standard deviation of the averaged signal strength fluctuation (or "power envelope") of the ith base station at time instant k; and N is the number of samples used in the above computation.

In one embodiment, $\alpha$ is set to 0.1 to provide exponential weighting that emphasizes relatively recent samples over older ones. Of course, $\alpha$ can be set to 1/N, where N is the number of samples, in which case the memory of the system is infinite and all samples are given equal weighting in the computed estimate of the fluctuation. In alternative embodiments, $\alpha$ can be selected from a variety of values to suit particular implementations of the invention.

Computation of Hysteresis

Figure 5:
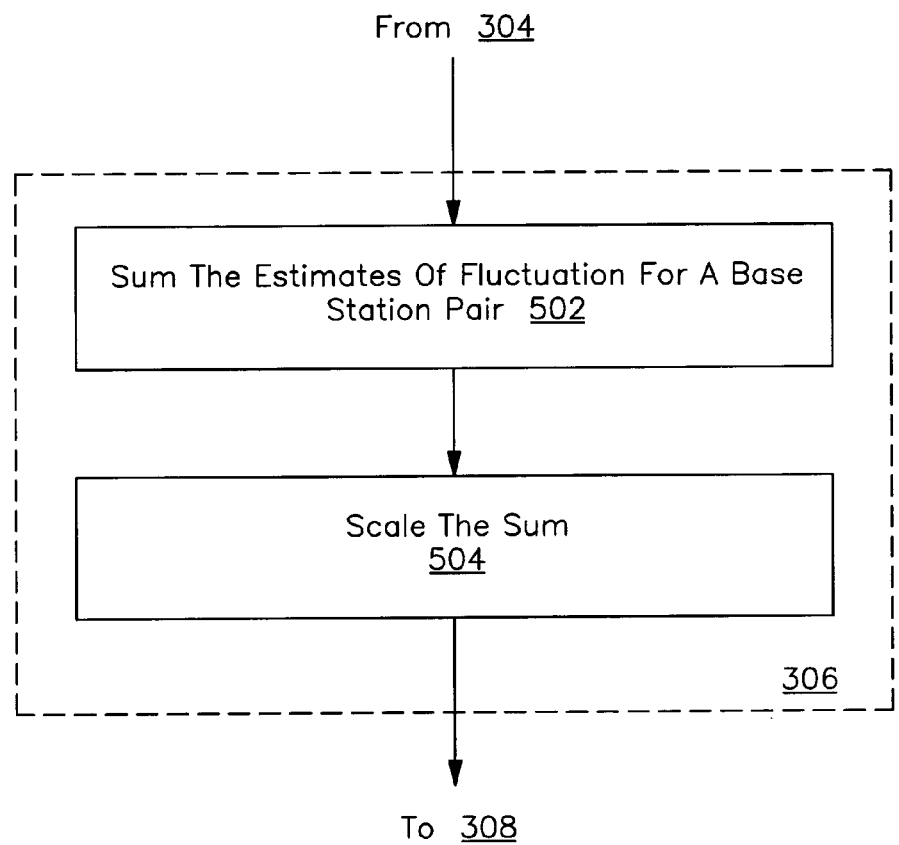
FIG. 5 is a flow diagram of a method for computing hysteresis as a function of the estimate of fluctuation in received signal strength for two or more base stations, in accordance with one embodiment of the invention.

FIG. 5 is a flow diagram of a method for computing hysteresis as a function of the estimate of fluctuation in received signal strength for two or more base stations, in accordance with one embodiment of the invention.

At block 502, the estimates of fluctuation in received signal strength for a base station pair are summed.

The base station pair, in one embodiment, represents an active base station and a candidate base station.

In one embodiment of the invention, the receive signal strength fluctuation associated with a particular base station pair is computed using equation 3 above. A such, the signal strength fluctuation is estimated and represented by the standard deviation of signal strength over one or more fixed-length averaging windows.

At block 504, the sum obtained at block 502 is scaled by a scaling factor to obtain the hysteresis for the base station pair. For example, in one embodiment, the hysteresis h is computed as follows:

$$h=m^*(\Gamma_A+\Gamma_C) \quad (4)$$

where m is the scaling factor, $\Gamma_A$ is the estimated standard deviation of the signal strength fluctuation for the current (active) base station and $\Gamma_C$ is the estimated standard deviation of the signal strength fluctuation for the candidate base station. The scaling factor m may be obtained through simulation appropriate for a particular communication system architecture and network in which the invention is implemented. In one embodiment of the invention, a scaling factor of m equal to a value between 1.5 and 2 is used. In alternative embodiments, particular network simulations may indicate a different range of values for m. As such, should the invention is not limited to the range of values for m described with reference to one particular embodiment of the invention.

Criteria for Base Station Selection

In accordance with one aspect of the invention, received signal strength and hysteresis (e.g., as provided by the cost function C) along with other base station selection criteria, such as base station load and estimated distance thereto, are used to select a base station.

Figure 6:
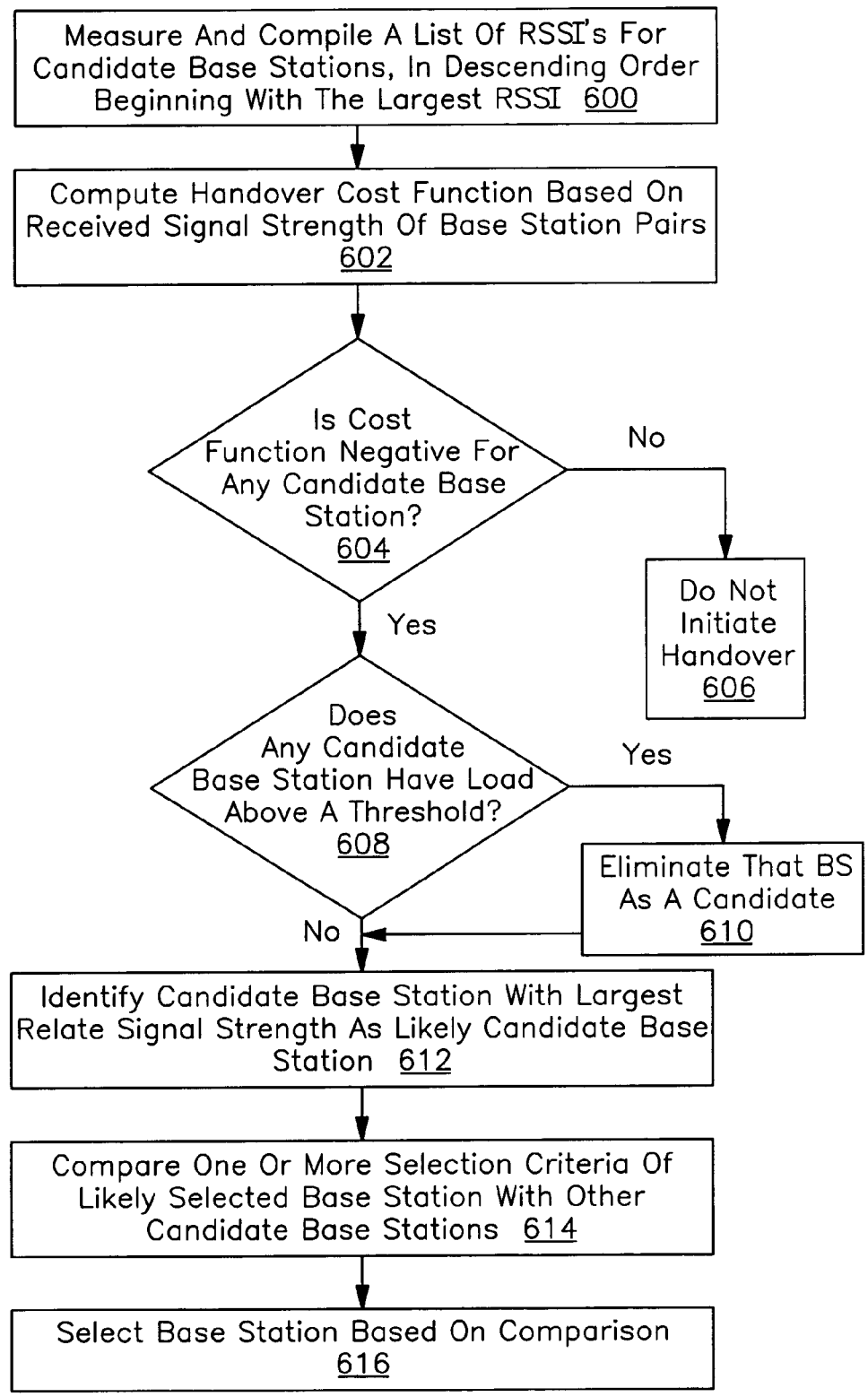
FIG. 6 is a flow diagram of a method for selecting a base station for handover, in accordance with one embodiment of the invention.

FIG. 6 is a flow diagram of a method for selecting a base station for handover, in accordance with one embodiment of the invention.

At block 600, a (receiving) user terminal measures the RSSI for a set of candidate base stations (i.e., those whose RSSI are above a given architecturally-specified threshold) and compiles a list of candidate base stations based on the measured RSSI's, where the largest RSSI appears at the top of the list as indicative of the most likely candidate base station for handover.

At block 602, a handover cost function is computed based on received signal strength and hysteresis for one or more base station pairs, wherein one of the base station pairs is the currently active base station and the other is the most likely candidate base station (in one embodiment, the one having the largest RSSI) from the list derived at block 600. The cost function, in one embodiment of the invention, is represented by the following equation:

$$C_i = (S_A - S_i) + h, \quad (1)$$

where h is the hysteresis (sometimes also referred to as the hysteresis margin or factor), $S_A$ is the RSSI of the current (or also sometimes referred to as the active) base station, and $S_i$ is the RSSI of an ith candidate base station, beginning with the one having the largest RSSI relative to the other (remaining) candidate base stations in the list.

At block 604, it is determined whether $C_i < 0$ for any candidate base station; if not, then at block 606, handover is not initiated and the current base station remains as such.

If $C_i < 0$ for any candidate base station, then at block 608, load information for that candidate base station is compared to a threshold. For example, in one embodiment, if for any candidate base station load exceeds a maximum load threshold, then at block 610 that candidate base station is eliminated as such from being a potential handover base station candidate.

In one embodiment, once any candidate base station(s) with load above a threshold have been eliminated from a given set of candidate base stations for handover, the remaining candidate base stations are ordered in accordance with their value for $C_i$, such that the base station having associated therewith the most negative value for $C_i$ appears at the top of the list as the most likely handover candidate, followed by the next most negative C value, and so on. In one embodiment, each base station indicates its load information in a broadcast burst it transmits periodically.

For example, in one embodiment, at block 612, the base station having the most negative value for $C_i$ is at the top of the list of candidate base stations as the most likely candidate base station $BS_i$ for handover/selection.

At block 614, one or more base station selection criteria of the most likely candidate base station $BS_i$ is compared with the other candidate base stations $BS_j$. In one embodiment, the comparison is performed in accordance with the ordering of $C_i$, beginning with the smallest value(s) for C first. In one embodiment, the criteria includes load, distance, and if applicable, also relative signal strength and hysteresis as provided by the cost function C.

In one embodiment, base stations in a communication network transmit broadcast messages in a synchronized manner according to a common timing reference. The common timing reference, in one embodiment, is a precise reference time derived from Global Positioning Satellite (GPS) system. As such, the user terminal can monitor a set of (candidate) base stations to determine a relative time-of-arrival between the transmissions of those base stations, and in particular, their broadcast messages. Moreover, the user terminal obtains from the current base station an indication of the propagation delay (Δ) based on the current base stations' measurement of time-of-arrival of uplink signals from the user terminal relative to the broadcast messages the base station transmitted. From the propagation delay (Δ), the user terminal can compute the true distances to both the current base station and the other (candidate) base stations.

In an alternative embodiments, distance can be computed based on time stamping of messages, for example, if both the base stations and user terminals are synchronized to a GPS clock and then measure time-of-arrival of messages and compare those to the time stamp included in such messages.

In one embodiment, if:

$$l_j < l_i / 2 \quad (5)$$

and $$d_j < d_i / 2 \quad (6)$$

both do not hold true, where $l_j$ is the load of the jth candidate base station, $l_i$ is the load of $BS_i$, $d_j$ is the distance to the jth candidate base station, and $d_i$ is the distance to $BS_i$, then $BS_i$ is selected at block 616 as the current base station.

If, on the other hand, conditions provided by equations (5) and (6) both hold true, and also $$(C_i - C_j) < 3 \text{ dB} \quad (7)$$

then the jth base station is selected as the current base station; i.e., handover will take place to the jth base station. Otherwise, $BS_i$ is selected as the current base station.

It should be appreciated that the particular threshold values provided in equations (5)-(7) can be adjusted and any combination of load, distance and/or signal strength may be weighted in a number of ways in other embodiments of the invention, depending on design choice and performance requirements. Thus, the invention should not be limited to the weighting and comparison equations of the particular embodiment that has been described.

Figure 7:
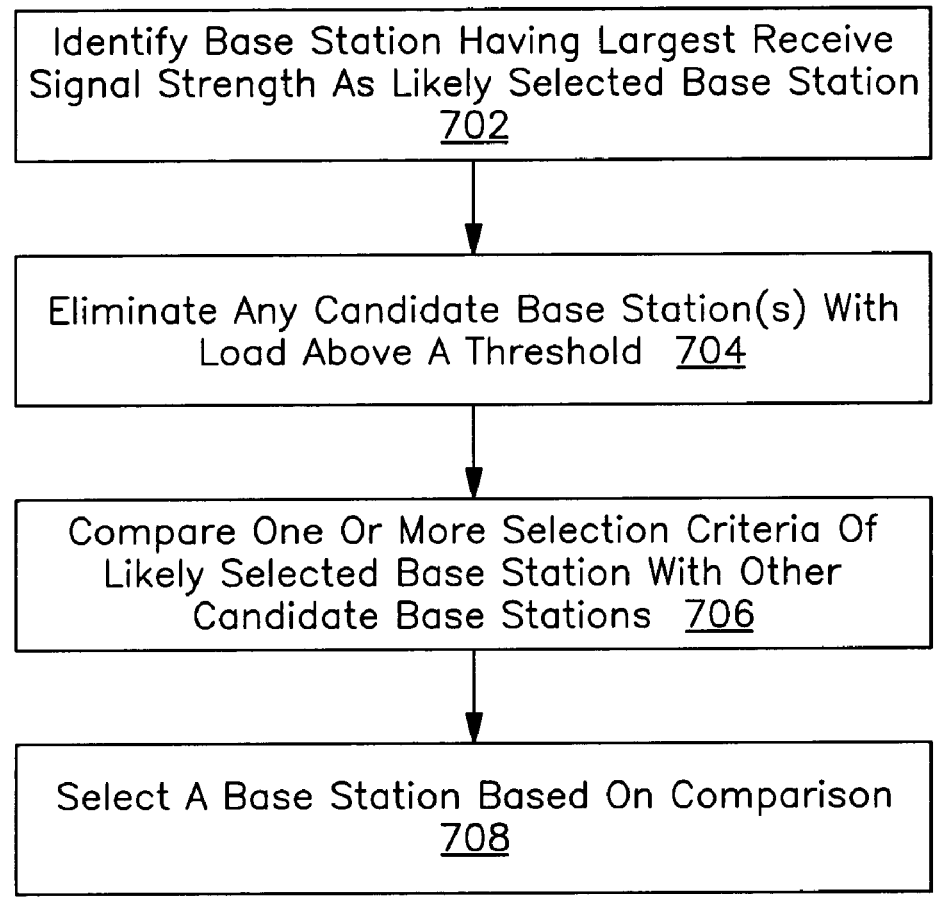
FIG. 7 is a flow diagram of a method for performing initial cell selection, in accordance with one embodiment of the invention.

FIG. 7 is a flow diagram of a method for performing initial cell selection, in accordance with one embodiment of the invention. Initial cell selection occurs when there is no current base station with which a user terminal is in active communication of traffic information; e.g., initial cell selection can occur when a user terminal powers up to register and "enter" a network and is searching for an optimum base station to be selected as a current/active base station. In the embodiment that is described, the method of initial cell selection is similar to that described for handover with reference to FIG. 6, except that hysteresis is set for zero.

At block 702, the base station having the largest receive signal strength (e.g., as provided by RSSI at the user terminal) is identified. In one embodiment, all base stations the user terminal can "hear" (e.g., those having RSSI above a system-defined threshold at the user terminal) are ordered according to their RSSI such that the base station with the largest RSSI appears at the top of the list of candidate base stations as the most likely base station, $BS_i$.

At block 704, any base station(s) with load larger than a threshold are eliminated from the list of candidate base stations. In one embodiment, the threshold is set to maximum.

At block 706, the load of the most likely base station, $BS_i$, is compared—in descending order of relative RSSI or other signal strength indicator—to the set of one or more remaining candidate base stations $BS_j$ using the following condition:

$$l_j < l_i/2. \quad (8)$$

In one embodiment, the comparison is done using base station pairs in the order of the list, beginning with the largest relative RSSI values.

If the condition of equation (8) does not hold true for any jth base station, $BS_i$ is selected at block 708 as the current base station.

However, if the condition of equation (8) does hold true for any jth base station, and the condition:

$$(S_i - S_j) < 3 \text{ dB} \quad (9)$$

holds true, where $S_i$ is the RSSI of $BS_i$ and $S_j$ RSSI of $BS_j$, then the jth base station is selected; otherwise, $BS_i$ is selected as the current base station.

Hardware Overview

It should be appreciated that the present invention may be useful in and thus embodied in various wireless systems and architectures, in which base stations, mobile or stationary user terminals, and the overall system can have various hardware/software configurations. Therefore, FIGS. 8-9 depict some, not all, exemplary architectures for communication devices that may employ the method and apparatus of the present invention in accordance with one or more embodiments of the invention.

The present invention relates to wireless communication systems that may provide fixed-access or mobile-access voice and/or data communications over the air. Such systems may use spatial division multiple access (SDMA) technology in combination with multiple access protocols, such as time division multiple access (TDMA), frequency division multiple access (FDMA) and code division multiple access (CDMA). Multiple access can be employed with frequency division duplex (FDD) or time division duplex (TDD). However, it should be appreciated that the invention is not limited to any particular wireless architecture, communication protocol, system or device.

Figure 8A:
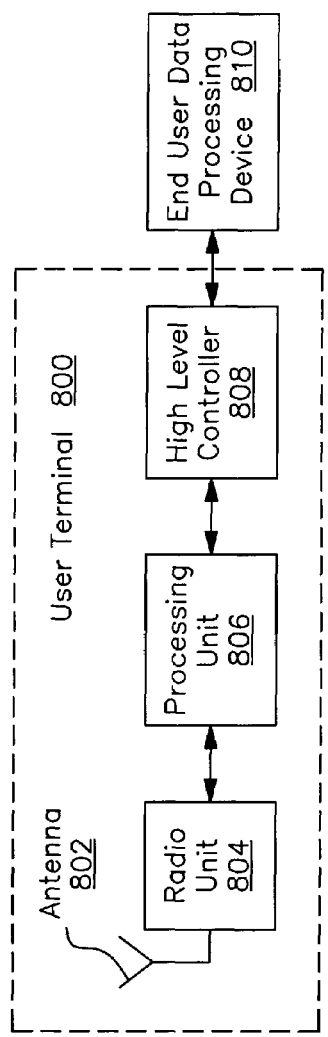
FIG. 8A is a block diagram of a user terminal that includes a base station selection mechanism, in accordance with one embodiment of the invention.
Figure 9:
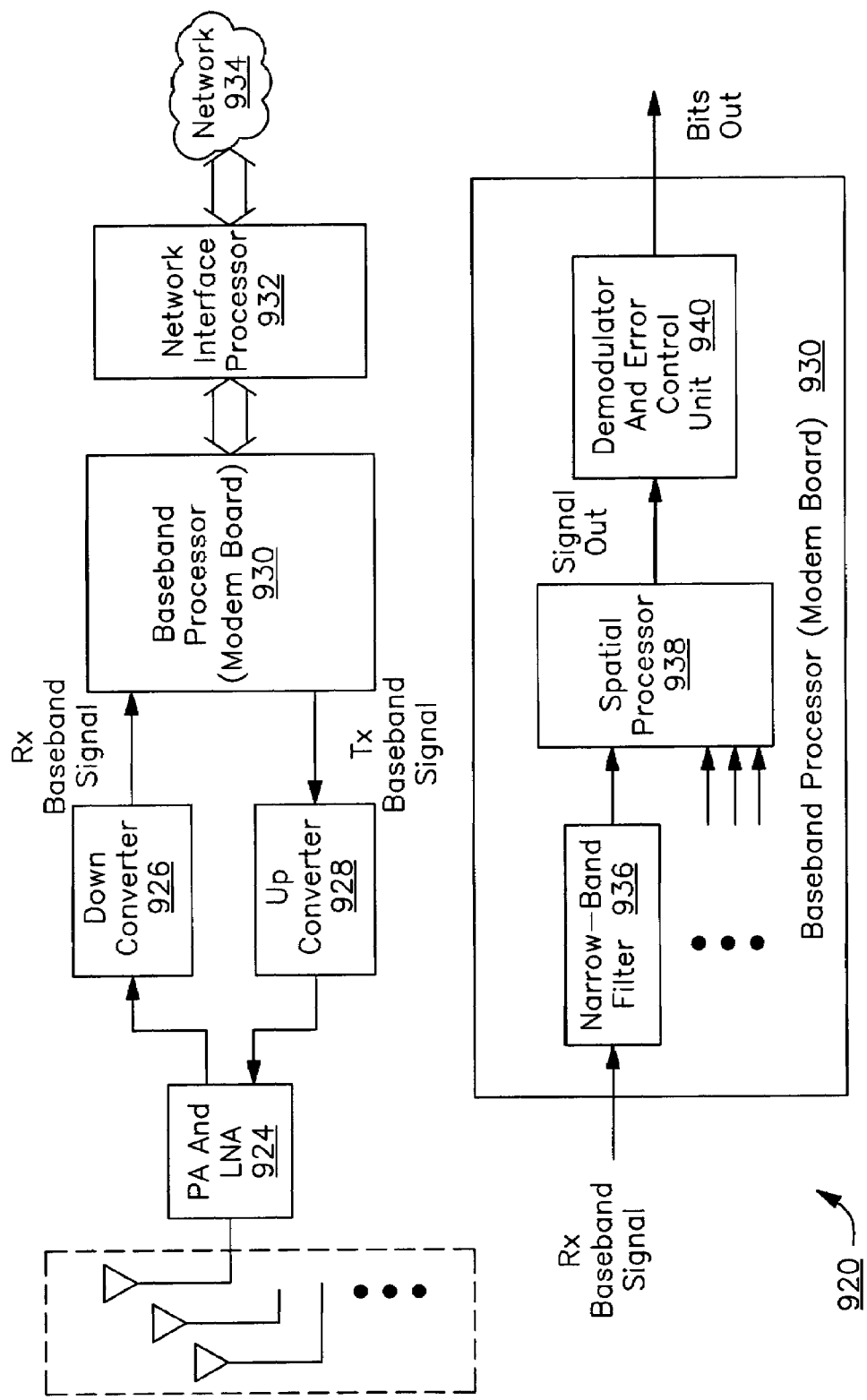
FIG. 9 is a block diagram of a base station that may be employed in a wireless communication system employing an embodiment of the invention.

FIG. 8A is a block diagram of a user terminal that includes a base station selection mechanism, in accordance with one embodiment of the invention. As shown, a user terminal 800 includes an antenna 802 (which may include one or more—i.e., an array—of antenna elements), coupled to a radio unit 804 for transmitting and receiving RF signals with one or more base stations, such as the one shown in FIG. 9. The radio unit 804 includes transmitter and receiver mechanisms, and will typically include one or more power amplifiers, LNA's, up/down converters, digital-to-analog and analog-to-digital converters, etc., for receiving signals over the air and providing them (typically after some down conversion) to a processing unit 806 coupled thereto, and similarly, up-converting baseband signals provided by the processing unit 806 and transmitting them, e.g., to a selected base station.

The processing unit 806, in turn, includes storage areas and processing circuitry for processing signals received or to be transmitted by the radio unit 804 via the antenna 802 of the user terminal 800. As shown, a high level controller 808, shown coupled to the processing unit 806, can be, in one embodiment of the invention, further coupled to an external end user data processing device 810. For example, the user terminal 800, in one embodiment, represents a wireless modem (e.g., as embodied in a PCMCIA form factor) that may be coupled to/integrated with the device 810, which may represent a laptop computer, PDA, gaming or other data processing device. As such, the high level controller 808 may receive user selected data to provide to the processing unit 806, which may in turn process the data (e.g., code it, modulate it, etc., in accordance with a particular wireless communication protocol), and provide the processed signals to the radio unit 804 to be transmitted to an active base station.

The processing unit 806, in accordance with one embodiment of the invention, includes a storage area (not shown) that stores machine-executable instructions that, when executed, cause the processing unit 806 to perform one or more of the methods of the present invention.

Although the user terminal 800 has been described with reference to a data communication modem, in alternative embodiments of the invention, the user terminal 800 may represent a voice processing radio unit, for example for a digital mobile/cellular telephone.

Figure 8B:
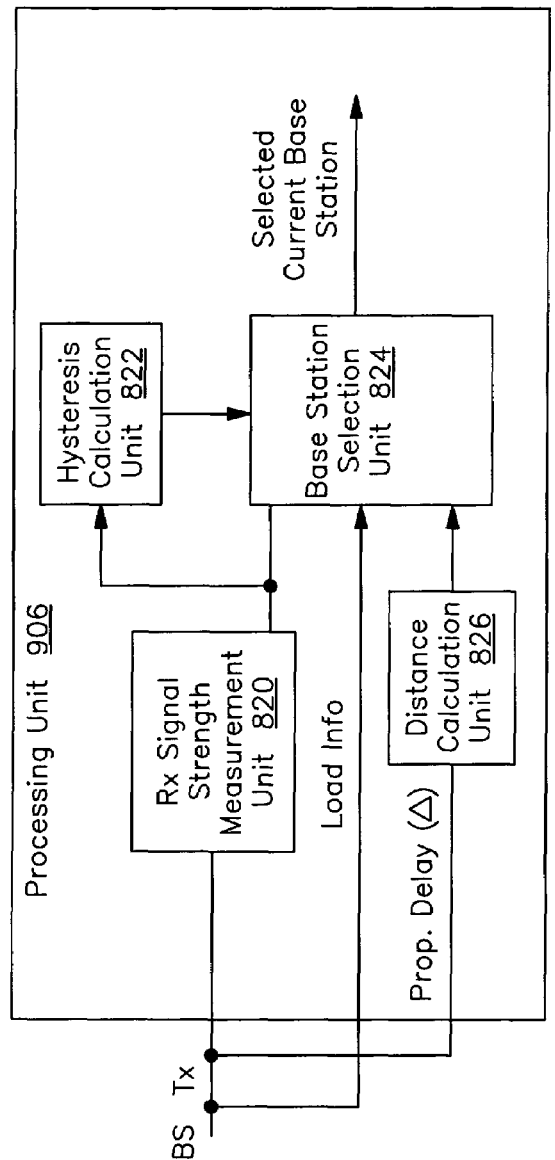
FIG. 8B is a block diagram of the processing unit of the user terminal depicted in FIG. 8A, in accordance with one embodiment of the invention

FIG. 8B is a block diagram of the processing unit of the user terminal depicted in FIG. 8A, in accordance with one embodiment of the invention. As shown, the processing unit receives transmitted signals from one or more base stations which are provided as input to a received signal strength measurement (RSSI) unit 820. In one embodiment, the signal received from a particular base station is a broadcast message burst that includes (1) an indication of the load (e.g., the number user terminals actively communicating with that base station or alternatively, an indication of whether the load is or is not above a threshold); and (2) an indication of propagation delay, from which distance to the base station can be derived by a distance calculation unit 826. The output of the distance calculation unit 826—namely, the estimated distance between the user terminal and the base station—is provided to a base station selection unit 824, as is the load information and the output of the RSSI unit 820.

The output of the RSSI unit 820 is also provided to a hysteresis calculation unit 822. The hysteresis calculation unit 822, in one embodiment, adaptively calculates hysteresis for use in a handover cost function, in accordance with a method of the invention as described herein. In an alternative embodiment, however, the hysteresis calculation unit may provide a hysteresis factor using one or a combination of other methods.

The base station selection unit 824, using the input hysteresis factor (if any), an indication of received signal strength as provided by the RSSI unit 820, as well as the load information and distance information, selects a base station, either initially or for handover, in accordance with a described method of the present invention.

FIG. 9 is a block diagram of a base station that may be employed in a wireless communication system employing an embodiment of the invention. As shown, a system 920, which may be part of a base station, in one embodiment, includes an antenna array 922, which in turn includes a number of antenna elements. The antenna array 922 is utilized for transmitting downlinks signals to one or more remote user terminals and for receiving uplinks signals from the one or more remote user terminals. In one embodiment, the antenna array 922 also transmits a broadcast message that indicates information about the base station, including, for example, an indication of reference time of transmission of the broadcast message (from which a receiving user terminal can estimate distance to the base station), an indication of the load of the base station, and in one embodiment, an indication of the transmit power the base station uses to transmit the message.

Of course, the system 920 may communicate with several remote user terminals, and as such, may process a number of signals each associated with a remote user terminal or other signal source. Furthermore, the system 920 may be employed in each of several base stations in a wireless communication network, where each base station uses a given set of channels to communicate with remote user terminal units within a given geographic region, e.g., a cell. Such remote user terminals may be stationary or mobile, and may communicate voice and/or data with the system 920 using PPP, TC/IP and/or other data or voice protocols. In one embodiment, each such remote user terminal is coupled to an external data processing device (e.g., a laptop computer, a PDA, a gaming device or other computing device) using an Ethernet or PPP-over-Ethernet (PPPoE) connection to allow such device to exchange data with the system 920 vis-à-vis a wireless communication link established between the user terminal and the system 920.

As shown in FIG. 9, each antenna element of the antenna array 922 is coupled to a power amplifier (PA) and low-noise amplifier (LNA) 924. The PA/LNA 924 of each antenna element amplifies the received (uplink) and/or transmitted (downlink) signal(s). As shown, each PA/LNA 924 is coupled to a down-converter 926 and an up-converter 928. The down-converter 926 converts the "raw" signal received by the antenna array 922 on a carrier frequency into a receive (Rx) baseband signal, which is provided to a baseband processor (also referred to as a modem board) 930. The up-converter 928, conversely, converts a transmit (Tx) baseband signal provided by the baseband processor 930 into a carrier frequency transmit signal, which is provided to the PA/LNA 924 to be transmitted (e.g., to a remote user terminal). Although not shown, analog-to-digital conversion (ADC) and digital-to-analog (DAC) circuitry may be coupled between the down-converter 926 and the baseband processor 930 and between the up-converter 928 and the baseband processor 930, respectively.

The baseband processor 930 typically includes hardware (e.g., circuitry) and/or software (e.g., machine-executable code/instructions stored on a data storage medium/device) to facilitate processing of received (uplink) and transmitted (downlink) signals. In accordance with the embodiment of the invention shown in FIG. 9, the baseband processor 930 includes at least one narrow-band filter 936 filter to filter received signals either in analog or digital form. The filtered signal from the narrow-band filter 936, in turn, is provided to a spatial processor 938.

The spatial processor 938 typically includes at least one general purpose processor and/or digital signal processor (DSP) to facilitate spatial processing. In one embodiment, the spatial processor 938, based on the spatial or spatio-temporal characteristic(s) (also known as a "spatial signature") of one or more uplink signals, is able to transmit and receive signals between one or more remote user terminals in a spatially selective manner. Accordingly, in one embodiment where spatial channels and SDMA is utilized, two or more remote user terminals may simultaneously receive and/or transmit on the same channel (e.g., carrier frequency and/or time slot and/or code) but may be distinguishable by the system 920 based on their unique spatial or spatio-temporal characteristic(s). However, in alternative embodiments of the invention, spatial channels may not be employed. One example of a spatial characteristic is direction of arrival (DOA) or angle of arrival (AOA). Other types of spatial characteristics known in the art of adaptive arrays may be employed in conjunction with the present invention.

In general, the antenna array 922 facilitates transfer of signals between the system 920 and a desired remote user terminal and/or one or more other devices (e.g., a plurality of remote user terminals, other base stations in a wireless communication network, a satellite communication network, etc.). For example, the antenna array may transmit downlink signals to the desired remote user terminal, and receive uplink signals from the remote user terminal. Such transmission and reception may occur in the same frequency channel but at different times (e.g., in a TDD system) or may occur at different frequencies (e.g., in an FDD system). The processor 938 determines the spatial characteristic(s) of the uplink signal from the desired remote user terminal, also referred to herein as a primary remote user terminal, as well as the spatial characteristic(s) of one or more other non-primary remote user terminals. Based on such characteristics, the system 920 determines a downlink beamforming strategy to enhance its transmission gain at the location of the desired remote user terminal, while relatively minimizing its transmission gain (i.e., providing a "null" or interference mitigated region) at the location of the non-primary remote user terminal(s). Similarly, the system 920, based on the spatial characteristics, may perform uplink beamforming to enhance its reception gain from the location of the primary remote user terminal, while minimizing its reception gain from the location(s) of one or more non-primary remote user terminals.

In one embodiment of the invention, the system 920 supports spatial channels, such that two or more remote user terminals in communication with the system 920 may simultaneously employ the same conventional frequency and/or time channel. In alternative embodiments, however, spatial channels may not be supported or utilized or may be utilized only when one or more conditions are met.

As shown in FIG. 9, the spatial processor 938 is further coupled to a demodulator and error control unit 940, which receives an "extracted" or "desired" signal or set of signals from the spatial processor 938, and outputs the extracted signal to a network processor 932. The unit 940 may perform error correction, provide packet overhead, and/or perform other processing before outputting the uplink information in the form of digital data to the network processor 932.

The network processor 932, which may or may not constitute part of the system 920, facilitates the transfer of information between the system 920 and an external network 934, which, for example, may represent the Internet, in which case the system 920 may be coupled (through wireless and/or wired links) to an Internet Service Provider (ISP). Such information may include voice and/or data and may be transferred in a packet-switched or circuit-switched manner. For example, in one embodiment, a remote user terminal may include a cellular telephone, two-way pager, PDA with wireless communication capability, a wireless modem that may be interfaced to a data processing device, such as a laptop computer, PDA, gaming device or other computing device, or other communication device to facilitate routing voice and/or data signals between the remote user terminal(s) and the network 934, which in this example may include the public switched telephone network (PSTN), the Internet, and/or other voice and data network. Thus, the remote user terminal may include or be interfaced with a computing device (e.g., a portable digital assistant, a laptop/notebook computer, a computing cellular telephone handset, etc.), along with a Web-browser, in which case the network 934 may represent the Internet and the network interface processor may facilitate communication between the remote user terminal (via the system 920) and one or more servers or other data processing systems coupled to the Internet. As such, voice and/or data (e.g., video, audio, graphics, text, etc.) may be transferred between the system 20 (and one or several remote user terminals in communication therewith) and an external network 934.

The term "base station" as used herein denotes a voice or data access point of wireless communication system that serves user terminals in a given geographical area. Such a base station, for example, may be an access point of a cellular-type voice (and/or data) communication system. Alternatively, the base station may represent an access point of an IEEE 802.X standard-based data communication network (e.g., 802.11, 802.16, 802.20, etc.). It should therefore be appreciated that although an exemplary architecture of a base station that may be used in a communication system embodying the present invention has been described, the invention is not necessarily limited to any particular base station or communication system architecture.

The elements shown in FIGS. 8-9 may be implemented by hardware, software or combination thereof, as will be apparent to those skilled in the art. For example, the elements in FIGS. 8-9 may be embodied in machine-executable instructions, which may be used to cause a general-purpose or special-purpose processor or logic circuits programmed with the instructions, to perform the method(s) of the present invention. Alternatively, the elements in FIGS. 8-9 may be implemented by logic or analog circuits to perform the method(s) of the present invention or with a combination of such circuits with machine-executable instructions (i.e., software).

The present invention in one embodiment is provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless internet data system for portable handsets or other user terminal devices (e.g., wireless modems that may be interfaced with various portable data processing devices), it can be applied to a wide variety of different wireless systems in which data is exchanged. Such systems include voice, video, music, broadcast and other types of data systems without external connections. The present invention can be applied to fixed user terminals as well as to low and high mobility terminals. Many of the methods are described herein in a basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

Although the invention has been described with reference to several embodiments, it will be appreciated that various alterations and modifications may be possible without departing from the spirit and scope of the invention, which is best understood by the claims that follow.

What is claimed is:

1. A method for facilitating handover between a base station pair in a communication system comprising:
   computing a cost function for the base station pair dependent on a relative received signal strength and an adaptive hysteresis factor dependent on the standard deviation of a residual signal from each base station of the base station pair, wherein a determination of the adaptive hysteresis factor comprises:
   computing the standard deviation of a residual signal associated with transmission from a first base station to obtain an estimate of the first base station signal strength fluctuation,
   computing the standard deviation of a residual signal associated with transmission from a second base station to obtain an estimate of the second base station signal strength fluctuation, and
   multiplying the sum of the estimated station signal strength fluctuation of the first and second base station with a scaling factor to obtain the adaptive hysteresis factor; and
   selecting a base station from the pair dependent on the cost function and a second factor, wherein the second factor is either base station load or physical distance between a user terminal and the base station.

2. The method of claim 1, wherein the physical distance is derived from a propagation delay determined from a relative time-of-arrival of a broadcast message transmitted from the base station synchronized according to a common timing reference.

3. The method of claim 1, wherein the physical distance is derived from a time-of-arrival of a time-stamped message transmitted from the base station.

4. The method of claim 1, wherein the scaling factor is in the range of 1.5 to 2.

5. The method of claim 1, wherein computing the standard deviation of the residual signal associated with transmission from a base station comprises:
   averaging measured signal strength associated with transmission from the base station over a first interval to obtain a first average;
   averaging measured signal strength associated with transmission from the base station over a second interval to obtain a second average, wherein the second interval is shorter than the first interval;
   subtracting the first average from the second average to obtain the residual signal; and
   determining the standard deviation of the residual signal.

6. The method of claim 5, wherein the first and second intervals each have a fixed length.

7. The method of claim 5, wherein the standard deviation is recursively determined over a span of transmission samples from the first base station.

8. The method of claim 7, wherein determining the standard deviation includes using a memory factor for weighting.

9. A method for computing an adaptive hysteresis factor to facilitate handover between a base station pair in a communication system comprising:

computing the standard deviation of a residual signal associated with transmission from a first base station to obtain an estimate of the first base station signal strength fluctuation;

computing the standard deviation of a residual signal associated with transmission from a second base station to obtain an estimate of the second base station signal strength fluctuation; and multiplying the sum of the estimated station signal strength fluctuation of the first and second base station with a scaling factor to obtain the adaptive hysteresis factor.

10. The method of claim 9, wherein computing the standard deviation of the residual signal associated with transmission from a base station comprises:

averaging measured signal strength associated with transmission from the base station over a first interval to obtain a first average;

averaging measured signal strength associated with transmission from the base station over a second interval to obtain a second average, wherein the second interval is shorter than the first interval;

subtracting the first average from the second average to obtain the residual signal; and determining the standard deviation of the residual signal.

11. A machine-readable medium having stored thereon a set of machine-executable instructions that, when executed by a data-processing system, cause the system to perform a method for facilitating handover between a base station pair in a communication system comprising:

computing a cost function for the base station pair based on a relative received signal strength and an adaptive hysteresis factor dependent on the standard deviation of a residual signal from each base station of the base station pair, wherein determination of the adaptive hysteresis factor comprises:

computing the standard deviation of a residual signal associated with transmission from a first base station to obtain an estimate of the first base station signal strength fluctuation, computing the standard deviation of a residual signal associated with transmission from a second station to obtain an estimate of the second base station signal strength fluctuation, and multiplying the sum of the estimated station signal strength fluctuation of the first and second base station with a scaling factor to obtain the adaptive hysteresis factor; and selecting a base station from the pair dependent on the cost function and a second factor, wherein the second factor is either base station load or physical distance between a user terminal and the base station.

12. The machine-readable medium of claim 11, wherein the physical distance is derived from a propagation delay determined from a relative time-of-arrival of a broadcast message transmitted from the base station synchronized according to a common timing reference.

13. The machine-readable medium of claim 11, wherein the scaling factor is in the range of 1.5 to 2.

14. The machine-readable medium of claim 11, wherein computing the standard deviation of the residual signal comprises:

averaging measured signal strength associated with transmission from the base station over a first interval to obtain a first average;

averaging measured signal strength associated with transmission from the base station over a second interval to obtain a second average, wherein the second interval is shorter than the first interval;

subtracting the first average from the second average to obtain the residual signal; and determining the standard deviation of the residual signal.

15. The machine-readable medium of claim 14, wherein the first and second intervals each have a fixed length.

16. The machine-readable medium of claim 14, wherein the standard deviation is recursively determined over a span of transmission samples from the first base station.

17. The machine-readable medium of claim 14, wherein determining the standard deviation includes using a memory factor for weighting.

18. A processing unit for facilitating handover between a base station pair in a communication system, comprising:

a base station selection unit to select a base station dependent on the inputs from a received signal strength measurement (RSSI) unit;

an adaptive hysteresis calculation unit that provides an adaptive hysteresis factor dependent upon the standard deviation of a residual signal from each base station of the base station pair, wherein the adaptive hysteresis calculation unit determines the standard deviation of the residual signal using a memory factor for weighting; and a distance calculation unit; wherein a determination of the adaptive hysteresis factor comprises: computing the standard deviation of a residual signal associated with transmission from a first base station to obtain an estimate of the first base station signal strength fluctuation, computing the standard deviation of a residual signal associated with transmission from a second base station to obtain an estimate of the second base station signal strength fluctuation and multiplying in the sum of the estimated station signal strength fluctuation of the first and second base station with a scaling factor to obtain the adaptive hysteresis factor.

19. The processing unit of claim 18, wherein the base station selection unit selects the base station dependent on a cost function and a base station load input.

20. The processing unit of claim 18, wherein the adaptive hysteresis calculation unit recursively determines the standard deviation of the residual signal from each base station of the base station pair.

* * * * *